United States Patent
Wang et al.

(10) Patent No.: US 11,939,519 B2
(45) Date of Patent: Mar. 26, 2024

(54) METHODS AND SYSTEMS TO REDUCE SCALE FORMATION

(71) Applicant: Saudi Arabian Oil Company, Dhahran (SA)

(72) Inventors: Qiwei Wang, Dhahran (SA); Mossaed A. Fahad, Dammam (SA); Sultan H. Alsubaie, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/898,076

(22) Filed: Aug. 29, 2022

(65) Prior Publication Data
US 2024/0067863 A1    Feb. 29, 2024

(51) Int. Cl.
C09K 8/528    (2006.01)
E21B 37/06    (2006.01)

(52) U.S. Cl.
CPC .............. *C09K 8/528* (2013.01); *E21B 37/06* (2013.01)

(58) Field of Classification Search
None
See application file for complete search history.

(56) References Cited

U.S. PATENT DOCUMENTS

| | | | |
|---|---|---|---|
| 2,947,690 A * | 8/1960 | Axelrad | E21B 36/00 299/6 |
| 3,888,310 A * | 6/1975 | Schievelbein | C02F 5/10 166/279 |
| 4,030,548 A * | 6/1977 | Richardson | C02F 5/08 210/698 |
| 4,692,252 A * | 9/1987 | Atwood | C02F 11/08 134/28 |
| 4,937,002 A | 6/1990 | Bainbridge et al. | |
| 5,755,972 A | 5/1998 | Hann et al. | |
| 7,093,663 B1 * | 8/2006 | Bader | B01D 61/58 166/371 |
| 7,392,848 B1 * | 7/2008 | Bader | C09K 8/03 166/371 |
| 7,789,159 B1 * | 9/2010 | Bader | B01D 61/364 166/371 |
| 7,902,137 B2 | 3/2011 | Kneipp et al. | |
| 9,605,236 B2 | 3/2017 | Dahlquist et al. | |
| 10,258,920 B1 * | 4/2019 | Bader | E21B 17/206 |
| 10,563,119 B2 | 2/2020 | Li et al. | |

(Continued)

FOREIGN PATENT DOCUMENTS

| AU | 701456 | 1/1999 |
|---|---|---|
| AU | 2009238632 | 10/2013 |

(Continued)

OTHER PUBLICATIONS

BinMerdhah et al., "Inhibition of barium sulfate scale at high-barium formation water," Journal of Petroleum Science and Engineering, 2012, 90-91(7):124-130, 8 pages.

(Continued)

*Primary Examiner* — John J Figueroa
(74) *Attorney, Agent, or Firm* — Fish & Richardson P.C.

(57) ABSTRACT

The disclosure relates to methods and systems that include an alkaline chemical to reduce (e.g., prevent) scale formation. Examples of alkaline chemicals include inorganic salts, organic salts and metal oxides. Typically, the alkaline chemical is used in combination with a scale inhibitor

9 Claims, 12 Drawing Sheets

(56) References Cited

U.S. PATENT DOCUMENTS

| | | | |
|---|---|---|---|
| 2003/0080066 A1 | 5/2003 | Vohra et al. | |
| 2007/0246426 A1* | 10/2007 | Collins | C09K 8/528 210/651 |
| 2009/0202089 A1 | 1/2009 | Sharif | |
| 2009/0298738 A1 | 12/2009 | Kneipp et al. | |
| 2011/0163032 A1 | 7/2011 | Alexander et al. | |
| 2018/0028978 A1* | 2/2018 | Chen | C02F 5/06 |
| 2019/0225867 A1 | 7/2019 | Li et al. | |
| 2020/0048529 A1 | 2/2020 | Li et al. | |
| 2023/0076912 A1* | 3/2023 | Mahmoud | C09K 8/528 |

FOREIGN PATENT DOCUMENTS

| | | |
|---|---|---|
| EP | 2888206 | 5/2019 |
| TW | I241988 | 10/2005 |
| WO | WO 2012109313 | 8/2012 |
| WO | WO 2017051640 | 3/2017 |

OTHER PUBLICATIONS

Boak, "The Influence of Divalent Cations on the Performance of BaSO4 Scale Inhibitor Species," SPE International Symposium on Oilfield Chemistry, 1999, SPE-50771-MS, 6 pages.

Fan, "Barite Nucleation and Inhibition at 0 to 200° C. with and Without Thermodynamic Hydrate Inhibitors," SPE Journal, 2011, 16(2):440-450, 6 pages.

Graham et al. "A Systematic Investigation of Factors Affecting the Formation of Zinc Sulfide (ZnS)," SPE Production & Operations, 2017, 32(3):314-324, 11 pages.

Graham et al., "The Influence of Formation Calcium on the Effectiveness of Generically Different Barium Sulphate Oilfield Scale Inhibitors," SPE-37273-MS, presented at the SPE International Symposium on Oilfield Chemistry, 1997, 16 pages.

He et al., "Mathematical inhibitor model for barium sulfate scale control," Langmuir, 1996, 12(7):1901-1905, 5 pages.

Labraoui-Djallal et al., "Evaluation Efficiency of Barium Sulfate Scale Inhibitors by Electrochemical Impedance Spectroscopy," Int. J. Electrochem. Sci., 2016, 11(1):1777-1788, 12 pages.

Shaw et al., "Synergistic Properties of Phosphonate and Polymeric Scale-Inhibitor Blends for Barium Sulfate Scale Inhibition," SPE Production & Operations, 2014, 30(1):16-25, 10 pages.

Shaw et al., "The Effects of Barium Sulfate Saturation Ratio, Calcium, and Magnesium on the Inhibition Efficiency—Part I: Phosphonate Scale Inhibitors," SPE Production & Operations, 2012, 27(3):306-317, 12 pages.

Shaw et al., "The Effects of Barium Sulphate Saturation Ratio, Calcium and Magnesium on the Inhibition Efficiency—Part II Polymeric Scale Inhibitors," SPE Production & Operations, 2012, 14 pages.

Tomson et al., "Mechanisms of Mineral Scale Inhibition," SPE Production & Facilities, Aug. 2003, 18(3):192-199, 8 pages.

Al Kalbani et al., "Impact of Relaxation of LSSW Parameters on Scaling Risk," SPE-200695-MS, presented at the SPE International Oilfield Scale Conference and Exhibition, Virtual, Jun. 24-25, 2020, 26 pages.

Al-Riyami et al., "When Will Low Sulphate Seawater No Longer Be Required on the Tiffany Field?," SPE-112537-MS, presented at the SPE International Symposium and Exhibition on Formation Damage Control, Lafayette, Louisiana, USA, Feb. 13-15, 2008, 15 pages.

BinGhanim et al., "High Temperature Fracturing Fluid Based on Nanofiltrated Seawater," SPE 189048, presented at the SPE Kingdom of Saudi Arabian Annual Technical Symposium and Exhibition, Dammam, Saudi Arabian, Apr. 2017, 17 pages.

BinGhanim et al., "Scale Mitigation Strategy for Fracturing Using Seawater-Based Fluid," SPE-188029-MS, SPE Kingdom of Saudi Arabia Annual Technical Symposium and Exhibition, Dammam, Saudi, Apr. 24-27, 2017, 13 pages.

Collins et al., "Sulphate Removal for Barium Sulphate Scale Mitigation a Deepwater Subsea Production System," SPE-87465-MS, presented at the SPE International Symposium on Oilfield Scale, Aberdeen, United Kingdom, May 26-27, 2004, 11 pages.

Davis et al., "The Advancement of Sulfate Removal from Seawater in Offshore Waterflood Operations," NACE-02314, presented at Corrosion 2002, Denver, Colorado, Apr. 7-11, 2002, 13 pages.

Heath et al., "Non-Chemical Methods for Downhole Control of Carbonate and Sulphate Scales—An Alternative Approach to Scale Management?," SPE-190706-MS, presented at the SPE International Oilfield Scale Conference and Exhibition, Aberdeen, Scotland, United Kingdom, Jun. 20-21, 2018, 16 pages.

Heatherly et al., "Sulfate Removal Technology for Seawater Waterflood Injection," OCT-7593-MS, presented at the Offshore Technology Conference, Houston, Texas, May 1994, 18 pages.

Liu et al., "Understanding the Co-deposition of Calcium Sulphate and Barium Sulphate and Developing Environmental Acceptable Scale Inhibitors Applied in HTHP Wells," SPE-156013, presented at the SPE International Conference and Exhibition on Oilfield Scale held in Aberdeen, United Kingdom, May 30-31, 2012, 10 pages.

Mackay et al., "Integrated Risk Analysis for Scale Management in Deepwater Developments," SPE-87459, Journal of Petroleum Technology 56(8):49-52, 17 pages.

Nasr-El-Din, "New Mechanisms of Formation Damage: Lab Studies and Case Histories," SPE-82253-MS, presented at SPE European Formation Damage Conference, The Hague, Netherlands, May 13-14, 2003, 12 pages.

Pedenaud et al., "Industrial Experience in Sea Water Desulfation," SPE-155123-MS, presented at the SPE International Conference and Exhibition on Oilfield Scale held in Aberdeen, United Kingdom, May 30-31, 2012, 8 pages.

Vu et al., "Eliminating the Need for Scale Inhibition Treatments for Elf Exploration Angola's Girassol Field," SPE-60220-MS, presented at the International Symposium on Oilfield Scale, Aberdeen, United Kingdom, Jan. 26-27, 2000, 10 pages.

* cited by examiner

METHODS AND SYSTEMS TO REDUCE SCALE FORMATION

FIELD

The disclosure relates to methods and systems that use an alkaline chemical to reduce (e.g., prevent) scale formation. Examples of alkaline chemicals include inorganic salts, organic salts and metal oxides.

BACKGROUND

In some instances, scale can form on one or more components of oil and gas producing wells, transportation lines and processing systems. Often, the scale is an inorganic scale, such as a carbonate salt of a divalent earth metal or a sulfate salt of a divalent earth metal. Examples of such salts include barium carbonate ($BaCO_3$), calcium carbonate ($CaCO_3$), strontium carbonate ($SrCO_3$), barium sulfate (barite, $BaSO_4$), calcium sulfate and strontium sulfate (celestite, $SrSO_4$). Examples of calcium sulfate include anhydrite ($CaSO_4$), gypsum ($CaSO_4 \cdot 2H_2O$), and hemi-hydrate ($CaSO_4 \cdot \frac{1}{2}H_2O$). Scale inhibitors can be used to reduce the formation of such scale. However, certain types of scale, such as sulfate scale (e.g., barite), can be relatively difficult to remove once formed.

SUMMARY

The disclosure relates to methods and systems that use an alkaline chemical to reduce (e.g., prevent) scale formation, including sulfate scale formation. Examples of alkaline chemicals include inorganic salts, organic salts and metal oxides. Typically, the alkaline chemical is used in conjunction with a scale inhibitor.

The methods and systems can be implemented in hydrocarbon production, transportation, processing and/or separation systems (e.g., a hydrocarbon-producing well, a wellbore, a downhole tubular to surface flowline, a component used to transport a hydrocarbon produced by the well, a component in a gas oil separation plant, a component in a gas processing plant, a component in an oil processing plant). For example, they can reduce (e.g., prevent) restrictions in hydrocarbon flow, damage to equipment, localized corrosion, impacts to oil-water separation and/or production shutdowns due to scale formation in hydrocarbon production, transportation and/or separation systems. The methods and systems can also reduce economic losses due to equipment damage and/or decreases in hydrocarbon production associated with scale formation.

Some scale inhibitors can be expensive and/or potentially toxic. The methods and systems of the disclosure can allow for the use of a reduced amount of scale inhibitor, which can reduce the cost and/or potential toxicity relate to scale inhibitor use.

The methods and systems of the disclosure can raise the pH of the water, which can reduce the corrosivity of the water. This can allow for the use of a relatively small amount of corrosion inhibitor.

The methods and systems of the disclosure can reduce operational expenses related to addressing scale formation and/or removal in hydrocarbon production, transportation and/or separation systems. Alternatively or additionally, the methods and systems of the disclosure can improve the performance of hydrocarbon production, transportation and/or separation systems by reducing scale formation and/or corrosion inhibitor use.

In a first aspect, the disclosure provides a method, including disposing a scale inhibitor and an alkaline chemical in a water stream, wherein the water stream includes sulfate ions and cations of a divalent earth metal, and the alkaline chemical includes an inorganic salt, an organic salt and/or a metal oxide.

In some embodiments, the divalent earth metal includes barium, calcium and/or strontium.

In some embodiments, the alkaline chemical includes an alkali metal salt of carbonate, an alkali metal salt of bicarbonate, and/or an alkali metal salt of hydroxide.

In some embodiments, the alkaline chemical includes sodium hydroxide, sodium carbonate, sodium bicarbonate, potassium hydroxide, potassium bicarbonate, potassium carbonate and/or calcium oxide.

In some embodiments, the alkaline chemical includes at least one metal oxide selected from the group consisting of calcium oxide and magnesium oxide.

In some embodiments, the alkaline chemical includes at least one organic salt selected from the group consisting of aryl bicarbonate and alkyl ethyl carbonate.

In some embodiments, the scale inhibitor is disposed in the water stream at a first location along the water stream, the alkaline chemical is disposed in the water stream at a second location along the water stream, and the second location is downstream of the first location.

In some embodiments, downstream of the second location, the water stream has a pH of from 6 to 8.5.

In some embodiments, downstream of the second location, a concentration of the alkaline chemical in the water stream is from 5 milligrams per liter (mg/L) to 500 mg/L.

In some embodiments, downstream of the first location, a concentration of the scale inhibitor in the water stream is from 5 ppm to 50 ppm.

In some embodiments, upstream of the first location, a concentration of the sulfate ions in the water stream is from 100 mg/L to 2500 mg/L.

In some embodiments, upstream of the first location, the divalent earth metal in the water stream includes barium, and a concentration of barium is from 5 mg/L to 250 mg/L.

In some embodiments, upstream of the first location, the divalent earth metal in the water stream includes strontium, and a concentration of strontium is from 100 mg/L to 2000 mg/L.

In some embodiments, upstream of the first location, the divalent earth metal in the water stream includes calcium, and a concentration of calcium is from 10000 mg/L to 30000 mg/L.

In some embodiments, the water stream is contained in an interior space of a conduit, and the conduit is a component of a wellbore, a downhole tubular to surface flowline, and/or a separation plant.

In a second aspect, the disclosure provides a system, including a conduit including an interior and at least one inlet. The interior of the conduit contains a water stream. The water stream includes sulfate ions and cations of at least one divalent earth metal. The at least one inlet includes a scale inhibitor and an alkaline chemical. The alkaline chemical includes an inorganic salt, an organic salt and/or a metal oxide.

In certain embodiments, the divalent earth metal includes barium, calcium and/or strontium.

In certain embodiments, the alkaline chemical includes sodium hydroxide, sodium carbonate, sodium bicarbonate, potassium hydroxide, potassium bicarbonate, potassium carbonate and/or calcium oxide.

In certain embodiments, the conduit is a component of a hydrocarbon-producing well, a downhole tubular to surface flowline and/or a component in a hydrocarbon separation plant.

In certain embodiments, the conduit includes a first inlet and a second inlet, the second inlet is downstream of the first inlet along a flow path of the water stream through the conduit, the scale inhibitor is disposed in the first inlet, and the alkaline chemical is disposed in second inlet.

In a third aspect, the disclosure provides a system, including a multi-branch conduit including first, second and third branches. The first branch includes an interior containing a first water stream. The first water stream includes sulfate ions and ions of a divalent earth metal. The first branch includes at least one inlet including a scale inhibitor and an alkaline chemical. The second branch includes an interior containing a second water stream. The second water stream includes ions of the divalent earth metal ions. A concentration of the ions of the divalent earth metal in the second water stream is higher than a concentration of the ions of the divalent earth metal in the first water stream. The third branch has an interior in fluid communication with the interior of the first branch and the interior of the second branch. The interior of the third branch is downstream of the interior of the first branch and the interior of the second branch.

In certain embodiments, the first branch includes a first inlet and a second inlet, the second inlet is downstream of the first inlet along a flow path of the water stream through the first branch, the scale inhibitor is disposed in the first inlet, and the alkaline chemical is disposed in the second inlet.

In certain embodiments, the multi-branch conduit is a component of a member selected from the group consisting of a component of a hydrocarbon-producing well, a downhole tubular to surface flowline and a component in a hydrocarbon separation plant.

DETAILED DESCRIPTION

Figure 1:
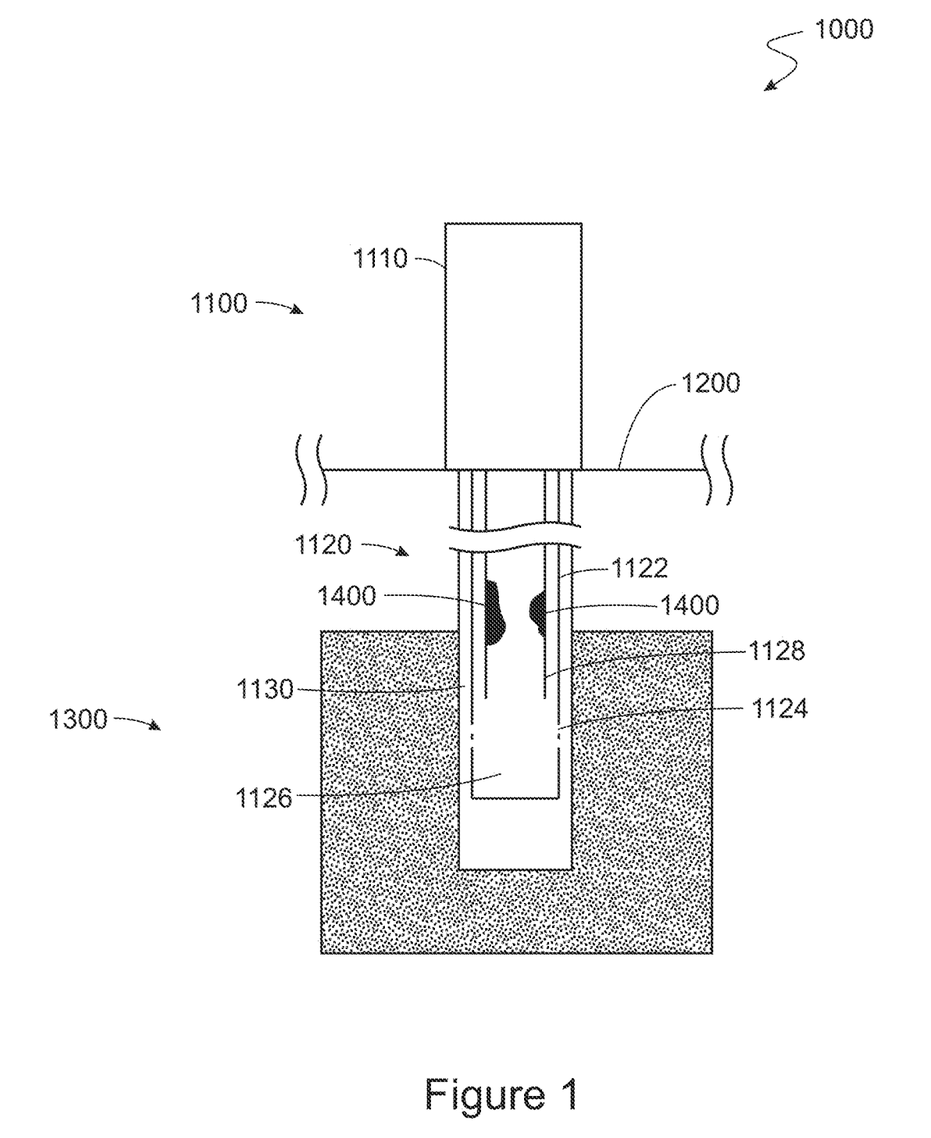
FIG. 1 schematically depicts a system.

FIG. 1 schematically depicts a system 1000 that includes a hydrocarbon-producing (e.g., oil-producing, gas-producing) well 1100 having a first portion 1110 above a surface of the earth 1200 and a second portion 1120 that extends below the surface 1200, through a borehole 1130, and into an underground formation 1300. The portion 1120 includes a casing 1122 having perforations 1124. The well 1100 is designed so that the perforations 1124 allow for fluid communication between an interior region 1126 of the casing 1122 and the underground formation 1300. A production tubing 1128 is disposed inside the casing 1122 to transport the hydrocarbon to the surface. In addition to the produced hydrocarbon, the well 1100 can produce water. Sulfate and/or carbonate and ions of divalent earth metals (barium, calcium, and/or strontium) dissolved in the water can form scale 1400 inside the production tubing 1128.

Although depicted in FIG. 1 as being in present inside the production tubing 1128, in some embodiments, scale can additionally or alternatively form on one or more other components of the hydrocarbon producing well 1100. In some embodiments, scale can form on the casing 1122, the borehole 1130, downhole completions (e.g., electric submersible pumps (ESP), subsurface safety valves (SSSV)) and/or a component of the first portion 1110 above the surface of the earth 1200. In some embodiments, scale can form on a component upstream or downstream of the components shown in FIG. 1.

Figure 2:
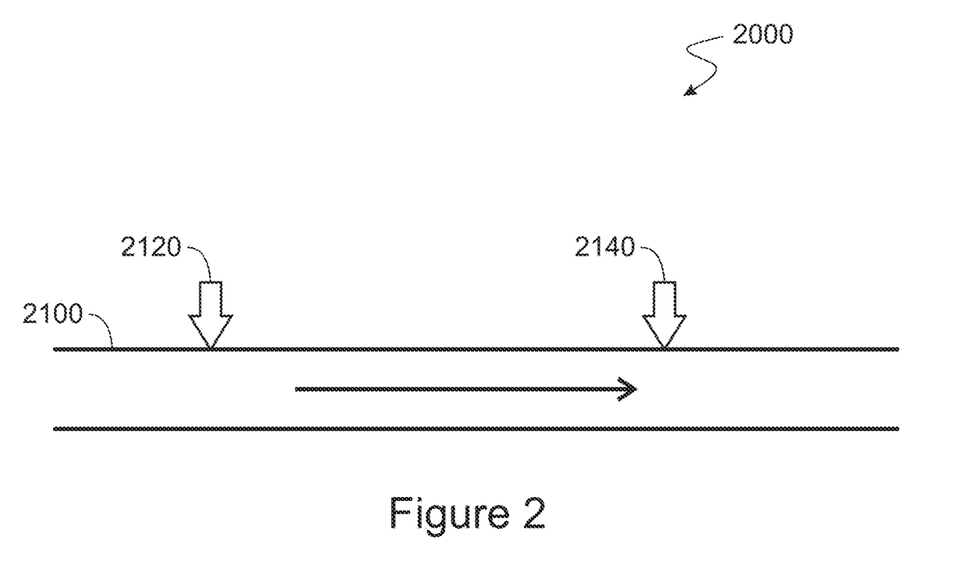
FIG. 2 schematically depicts a system.

FIG. 2 schematically depicts a conduit 2000 which represents a water-carrying component of the system 1000 (see discussion above). The conduit 2000 carries a water stream 2100. The water stream 2100 contains sulfate ions and ions of at least one divalent earth metal (barium, calcium, and/or strontium), which are capable of interacting with each other to form sulfate scale. The conduit 2000 has a first inlet 2120 and a second inlet 2140 downstream of the first inlet 2120. A scale inhibitor is disposed in the water stream 2100 via the first inlet 2120, and an alkaline chemical (e.g., inorganic salt, organic salt, metal oxide) is disposed in the water stream 2100 via the second inlet 2140. The presence of both the scale inhibitor and the alkaline chemical in the water stream 2100 reduces the amount of sulfate scale formation in the conduit 2000 (and, in some instances, downstream of the conduit 2000) relative to the amount of sulfate scale that would be formed in an otherwise identical conduit in which the alkaline chemical is not added to the water stream 2100. Without wishing to be bound by theory, it is believed that the increase in pH of the water stream due to the addition of the alkaline chemical increases the interactions between the scale inhibitor and sulfate scaling crystals, resulting in the scale inhibitor being more effective at inhibiting sulfate scale formation.

In some embodiments, the alkaline chemical includes a carbonate salt and/or a bicarbonate salt (e.g., an inorganic carbonate salt, an organic carbonate salt, an inorganic bicarbonate salt, an organic bicarbonate salt). In such embodiments, the carbonate salt can potentially interact with the divalent earth metal ions in the water stream 2100 to form carbonate scale. Thus, it can be beneficial to add the scale inhibitor to the water stream 2100 before adding the carbonate salt to the water stream 2100 so that the scale inhibitor is present in the water stream 2100 and can inhibit carbonate scale formation.

The alkaline chemical can be an inorganic salt, an organic salt or a metal oxide.

Examples of inorganic salts include hydroxides, carbonates and bicarbonates of an alkali metal (e.g., sodium, potassium). Examples of such salts include sodium hydroxide, sodium carbonate, sodium bicarbonate, potassium hydroxide, potassium bicarbonate, potassium carbonate. In addition to hydroxides, carbonates and bicarbonates of an alkali metal (e.g., sodium, potassium), the inorganic salt can be ammonium hydroxide.

Examples of organic salts of carbonate and bicarbonate include aryl bicarbonate and alkyl ethyl carbonate. Examples of metal oxides include metal oxides (e.g., calcium oxide (CaO)) that react with water to form hydroxide ions, such as depicted in reaction (1).

$$CaO + H_2O \rightarrow Ca^{2+} + 2OH^- \tag{1}$$

Other than CaO, examples of metal oxides capable of reacting with water to form hydroxide ions include magnesium oxide (MgO).

Figure 3:
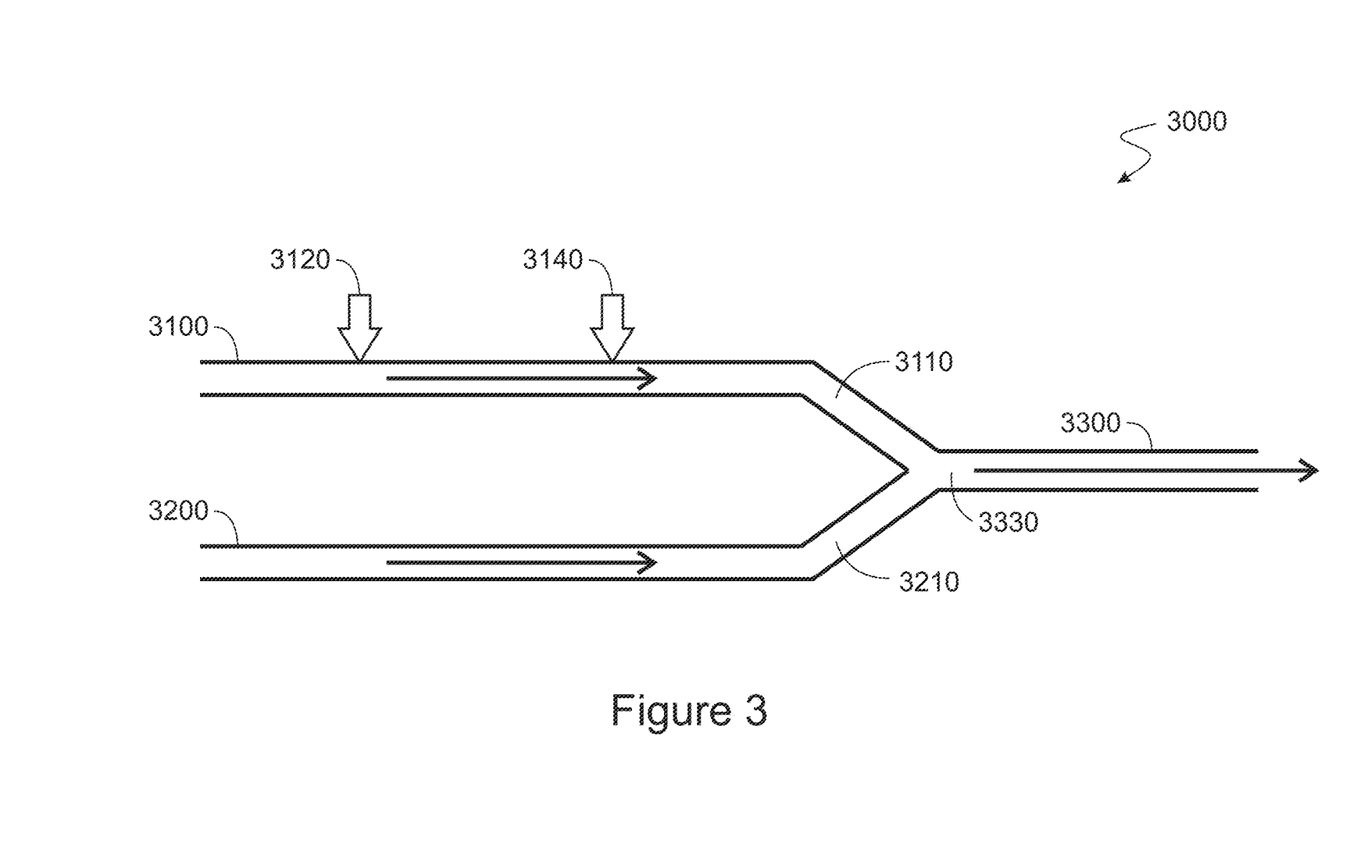
FIG. 3 schematically depicts a system.

FIG. 3 depicts a multi-branch conduit 3000 which represents a water-carrying component of the system 1000 (see discussion above). The multi-branch conduit 3000 includes a first water stream 3100, a second water stream 3200 and a third water stream 3300. The first water stream 3100 and the second water stream 3200 include outlets 3110 and 3210, respectively, in fluid communication with an inlet 3330 of the third water stream 3300. Thus, during use, the water streams 3100 and 3200 combine at inlet 3330 to form the water stream 3300. The first water stream 3100 contains sulfate ions. The first water stream 3100 and the second water stream 3200 contain divalent earth metal ions. The concentration of the divalent earth metal ions in the second water stream 3200 is greater than the concentration of the divalent earth metal ions in the first water stream 3100. The first water stream 3100 has a first inlet 3120 and a second inlet 3140 downstream of the first inlet 3120. A scale inhibitor is disposed in the water stream 3100 via the first inlet 3120, and an alkaline chemical (e.g., inorganic salt, organic salt, metal oxide) is disposed in the water stream 3100 via the second inlet 3140. An amount of scale formed in the third water stream 3300 is reduced relative to an otherwise identical conduit in which the alkaline chemical is not added.

Similar to the situation discussed above with respect to FIG. 2, in embodiments in which the alkaline chemical includes a carbonate and/or bicarbonate salt, it can be beneficial to dispose the scale inhibitor into the water stream 3100 upstream of where the carbonate and/or carbonate sale is disposed in the water stream 3100. Additionally, it can be beneficial to dispose the scale inhibitor and/or the alkaline chemical into the water stream 3100 with the lower concentration of divalent earth metal ions rather than the water stream 3200 with the higher concentration of divalent earth metal ions as the divalent earth metal ions (e.g., calcium ions) may react with the scale inhibitor and/or alkaline chemical. For example, the divalent earth metal ions (e.g., calcium ions) can react with the alkaline chemical to form scale (e.g., calcium carbonate scale) and/or the divalent earth metal ions (e.g., calcium ions) can react with the inhibitor to form a solid precipitate around the first inlet 3120.

As noted above, the conduit 2000 or conduit 3000 represents a component of a hydrocarbon (e.g., oil, gas) production, transportation, processing, and/or separation system (e.g., a hydrocarbon-producing well, a wellbore, a downhole tubular to surface flowline, a component used to transport a hydrocarbon produced by the well, a component in a gas oil separation plant, a component in a gas processing plant, a component in an oil processing plant). Alternatively or additionally, however, the water streams 2100, 3100, 3200 and/or 3300 can represent a water stream in and/or near a hydrocarbon (e.g., oil, gas) production, transportation, processing, and/or separation system (e.g., a hydrocarbon-producing well, a wellbore, a downhole tubular to surface flowline, a component used to transport a hydrocarbon produced by the well, a component in a gas oil separation plant, a component in a gas processing plant, a component in an oil processing plant).

In some embodiments, the pH of the water (e.g., the water streams 2100, 3100 and/or 3300) is at least 6 (e.g., at least 6.5, at least 7, at least 7.5) and at most 8.5 (e.g., at most 8, at most 7.5, at most 7, at most 6.5) after the addition of the alkaline chemical.

In certain embodiments, the concentration of the alkaline chemical is at least 5 (e.g., at least 10, at least 50, at least 100, at least 150, at least 200, at least 250, at least 300, at least 350, at least 400, at least 450) milligrams per liter (mg/L) and at most 500 (e.g., at most 450, at most 400, at most 350, at most 300, at most 250, at most 200, at most 150, at most 100, at most 50, at most 10) mg/L in the water stream (e.g., the water streams 2100, 3100 and/or 3300) after the addition of the alkaline chemical. In certain embodiments, the concentration of the scale inhibitor is at least 5 (e.g., at least 10, at least 15, at least 20, at least 25, at least 30, at least 35, at least 40, at least 45) ppm and at most 50 (e.g., at most 45, at most 40, at most 35, at most 30, at most 25, at most 20, at most 15, at most 10) ppm in the water stream (e.g., the water streams 2100, 3100 and/or 3300) after the addition of the scale inhibitor.

In some embodiments, the concentration of sulfate in in the water stream (e.g., the water streams 2100, 3100, 3200 and/or 3300) is at least 100 (e.g., at least 200, at least 300, at least 400, at least 500, at least 600, at least 700, at least 800, at least 900, at least 1000, at least 1100, at least 1200, at least 1300, at least 1400, at least 1500, at least 1600, at least 1700, at least 1800, at least 1900, at least 2000, at least 2100, at least 2200, at least 2300, at least 2400) mg/L and at most 2500 (e.g., at most 2400, at most 2300, at most 2200, at most 2100, at most 2000, at most 1900, at most 1800, at most 1700, at most 1600, at most 1500, at most 1400, at most 1300, at most 1200, at most 1100, at most 1000, at most 900, at most 800, at most 700, at most 600, at most 500, at most 400, at most 300, at most 200) mg/L. In some embodiments, the concentration of barium in the water stream (e.g., the water streams 2100, 3100, 3200 and/or 3300) is at least 5 (e.g., at least 10, at least 50, at least 100, at least 150, at least 200) mg/L and at most 250 (e.g., at most 200, at most 150, at most 100, at most 50, at most 10) mg/L. In some embodiments, the concentration of strontium in the water stream (e.g., the water streams 2100, 3100, 3200 and/or 3300) is at least 100 (e.g., at least 200, at least 300, at least 400, at least 500, at least 600, at least 700, at least 800, at least 900, at least 1000, at least 1100, at least 1200, at least 1300, at least 1400, at least 1500, at least 1600, at least 1700, at least 1800, at least 1900, at least 2000, at least 2100, at least 2200, at least 2300, at least 2400) mg/L and at most 2000 (e.g., at most 1900, at most 1800, at most 1700, at most 1600, at most 1500, at most 1400, at most 1300, at most 1200, at most 1100, at most 1000, at most 900, at most 800, at most 700, at most 600, at most 500, at most 400, at most 300, at most 200) mg/L. In some embodiments, the concentration of calcium in the water stream (e.g., the water streams 2100, 3100, 3200 and/or 3300) is at least 10000 (e.g., at least 15000, at least 20000, at least 25000) mg/L and at most 30000 (e.g., at most 25000, at most 20000, at most 15000) mg/L.

EXAMPLES

Example 1—Chemical Composition of Produced Water

Cation (metal ions such as sodium, potassium, magnesium, calcium, strontium and barium) concentrations were determined by Inductively Coupled Plasma equipped with Optical Emission Spectroscopy (ICP-OES) (Agilent Technologies, Model: 5110). Samples were acidized to a pH value of <2 with nitric acid prior to measurement.

Sulfate and chloride concentrations were measured using Ion Chromatography (IC). An aliquot of sample was injected into an ion chromatograph (Dionex, Model: ICS 3000). The sample was pumped through two columns, a suppressor device, and into a conductivity detector. The analytical column and the guard column were packed with an anion exchange resin. Ions were separated based on their affinity for the exchange sites of the resin. The suppressor device contained a fiber- or membrane-based cation exchanger that was continuously regenerated by a flow of dilute electrolytic suppressor. The suppressor device reduced the background conductivity of the eluent to a low or negligible level by replacing the cations with hydrogen ions, thereby converting the anions in the sample to their corresponding acids. The separated anions in their acid form were measured using an electrical-conductivity cell. Anions were identified based on their retention times compared to known standards (Fluka). The quantification of sulfate was accomplished by measuring the peak area and comparing it to a calibration curve generated from known standards.

Alkalinity was measured by titration. A pH meter was calibrated against three standard buffers (4.01, 7.00, 10.01 from Thermo Orion) before use. A 100 mL water sample was titrated with 0.1N HCl acid to the end point of pH 4.2. If a sample had a pH≤4.2, the alkalinity was taken as zero.

Table 1 lists the compositions of water samples collected at a slug catcher where waters produced from different gas wells were comingled. Table 2 lists the compositions of formation water samples from the sandstone reservoir of the gas wells. No alkalinity was detected in the water samples of Tables 1 and 2.

TABLE 1

Geochemical composition of mixed waters at the slug catcher of a gas plant

| | (ppm) | | | | | |
|---|---|---|---|---|---|---|
| | # A | # B | # C | # D | # E | # F |
| Sodium | 21400 | 7650 | 15000 | 14100 | 14800 | 15800 |
| Potassium | 1457 | 540 | 990 | 940 | 927 | 1054 |
| Magnesium | 622 | 236 | 518 | 530 | 461 | 497 |
| Calcium | 6200 | 3140 | 7300 | 7030 | 6860 | 8140 |
| Strontium | 574 | 260 | 480 | 450 | 440 | 480 |
| Barium | 582 | 285 | 333 | 365 | 240 | 217 |
| Chlorides | 47818 | 18757 | 38977 | 37056 | 36128 | 41634 |
| Sulfates | 137 | 142 | 128 | 124 | 120 | 119 |
| Alkalinity | 0 | 0 | 0 | 0 | 0 | 0 |

TABLE 2

Geochemical compositions of produced water from a sandstone reservoir

| | (mg/L) | | | | | | |
|---|---|---|---|---|---|---|---|
| | Ca | Mg | Ba | Sr | Alkalinity | Chloride | TDS |
| Well #1 | 19,449 | 1,331 | 14 | 1,522 | 0 | 125,038 | 196,350 |
| Well #2 | 26,083 | 1,393 | 1775 | 1,739 | 10 | 108,284 | 181,938 |
| Well #3 | 40,420 | 1,605 | 3137 | 2,578 | 0 | 195,813 | 295,437 |
| Well #4 | 40,102 | 1,703 | 3317 | 2,720 | 0 | 186,719 | 288,365 |
| Well #5 | 25,700 | 1,410 | 2898 | 2,900 | 0 | 143,000 | 230,766 |
| Well #6 | 27,611 | 1,484 | 5852 | 3,371 | 12 | 159,192 | 256,235 |
| Well #7 | 16,000 | 795 | 482 | 1,300 | 0 | 87,800 | 142,116 |
| Well #8 | 20,941 | 806 | 32 | 1,088 | 0 | 147,599 | 228,227 |
| Well #9 | 25,884 | 1,399 | 4850 | 2,756 | 0 | 161,328 | 251,663 |
| Well #10 | 28,912 | 1,129 | 47 | 1,486 | 0 | 193,553 | 299,956 |

Example 2—Scaling Tendency Calculations

Scaling tendency calculations were performed using ScaleSoftPitzer model (Brine Chemistry Consortium, Rice University). The input parameters included the water compositions of Table 1 as well as the pH, temperature and pressure at the point of interest. The calculations indicated that the water samples of Table 1 were only supersaturated with respect to barium sulfate (barite) scale.

Example 3—Turbidity Measurements

Figure 4:
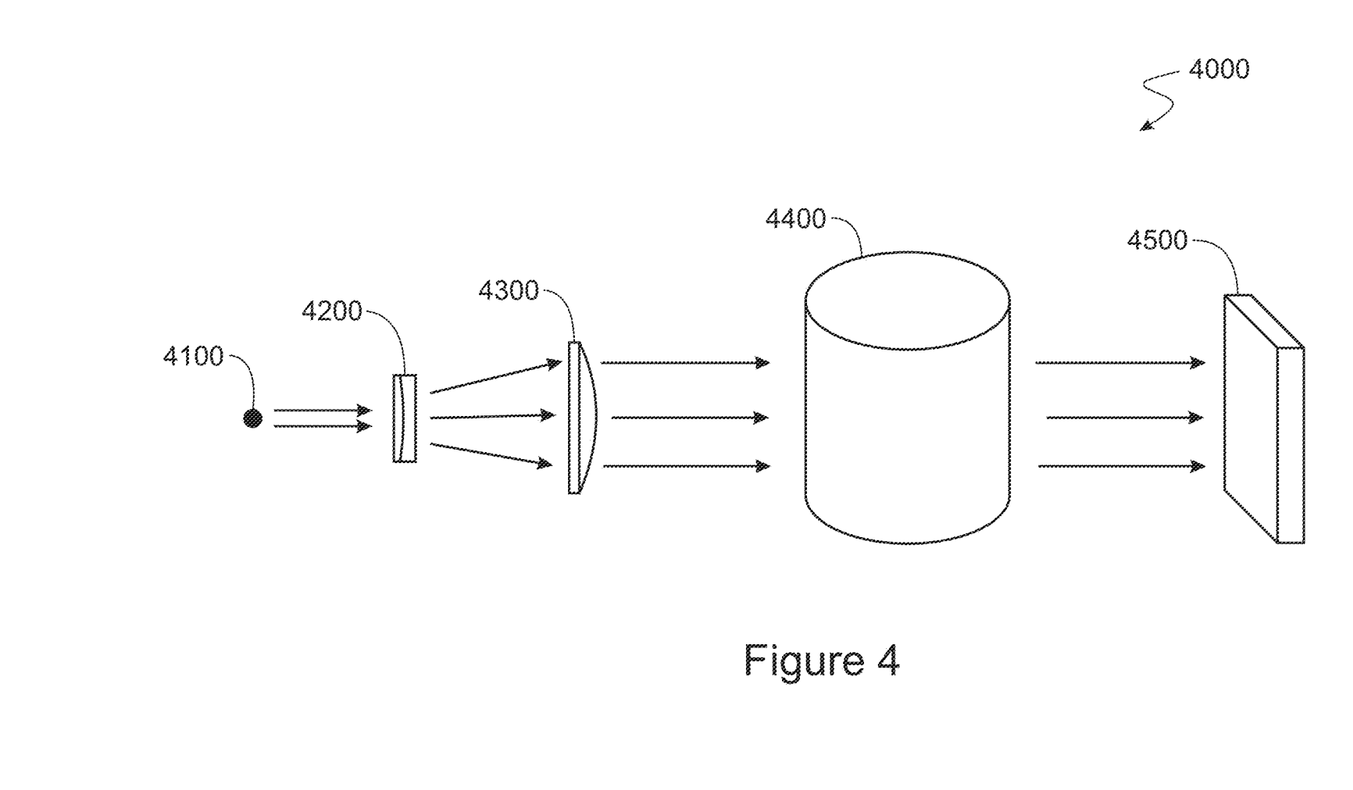
FIG. 4 schematically depicts an experimental setup.

A laser apparatus 4000, as schematically depicted in FIG. 4, was used to measure changes in turbidity. A laser 4100 (wavelength of 635 nm, Edmund Optics, part #83838) generated a beam that was expanded using a concave lens 4200 and a convex lens 4300. The beam was passed through a sample 4400 and detected on a detector 4500 (Hamamatsu, part #S2387-1010R). The apparatus was able to detect barite scale formation in-situ by monitoring the change of laser intensity received on the detector 4500. If barite scale formation occurred, laser light was scattered by scale particles, which caused a decrease of the laser intensity reaching the detector 4500. A multimeter was used to continuously measure the laser intensity on the detector 4500 and the reading was recorded every 5 seconds. Tests were conducted at 25° C. (77° F.).

Synthetic waters were prepared with reagent grade chemicals and deionized water. 10.4 g/L $MgCl_2 \cdot 6H_2O$, 45.48 g/L $CaCl_2 \cdot 2H_2O$, 3.49 g/L $SrCl_2 \cdot 6H_2O$ and 2.07 g/L $BaCl_2 \cdot 2H_2O$ salts were used for cation water and 0.41 g/L $Na_2SO_4$, KCl and 108.63 g/L NaCl were used for anion water. A 50:50 (in volume) mixing of these two water provided the desired water composition. Stock solutions (1%) of scale inhibitor and alkaline material were also prepared. In tests, 50 mL anion water was added to the test bottle, followed by scale inhibitor and alkaline material, then 50 mL cation water was added and measurements were immediately started.

Two scale inhibitor products were tested: MC MX2-5318 (Halliburton), and Gyptron KT-126 (ChampionX). The samples tested are listed in Table 3.

TABLE 3

Samples tested

| Run # | Alkaline added | Scale inhibitor added |
|---|---|---|
| #1 | none | none |
| #2 | none | 50 ppm KT-126 |
| #3 | none | 50 ppm MC MX2-5318 |
| #4 | 50 ppm, $Na_2CO_3$ | none |
| #5 | 50 ppm, $Na_2CO_3$ | 50 ppm KT-126 |
| #6 | 50 ppm, $Na_2CO_3$ | 50 ppm MC MX2-5318 |
| #7 | 50 ppm $Na_2CO_3$ | 15 ppm KT-126 |
| #8 | 25 ppm $Na_2CO_3$ | 25 ppm KT-126 |
| #9 | 50 ppm $Na_2CO_3$ | 15 ppm MC MX2-5318 |
| #10 | 50 ppm $Na_2CO_3$ | 10 ppm MC MX2-5318 |
| #11 | 25 ppm KOH | none |
| #12 | 25 ppm KOH | 25 ppm KT-126 |
| #13 | 25 ppm KOH | 25 ppm MC MX2-5318 |

Figure 5:
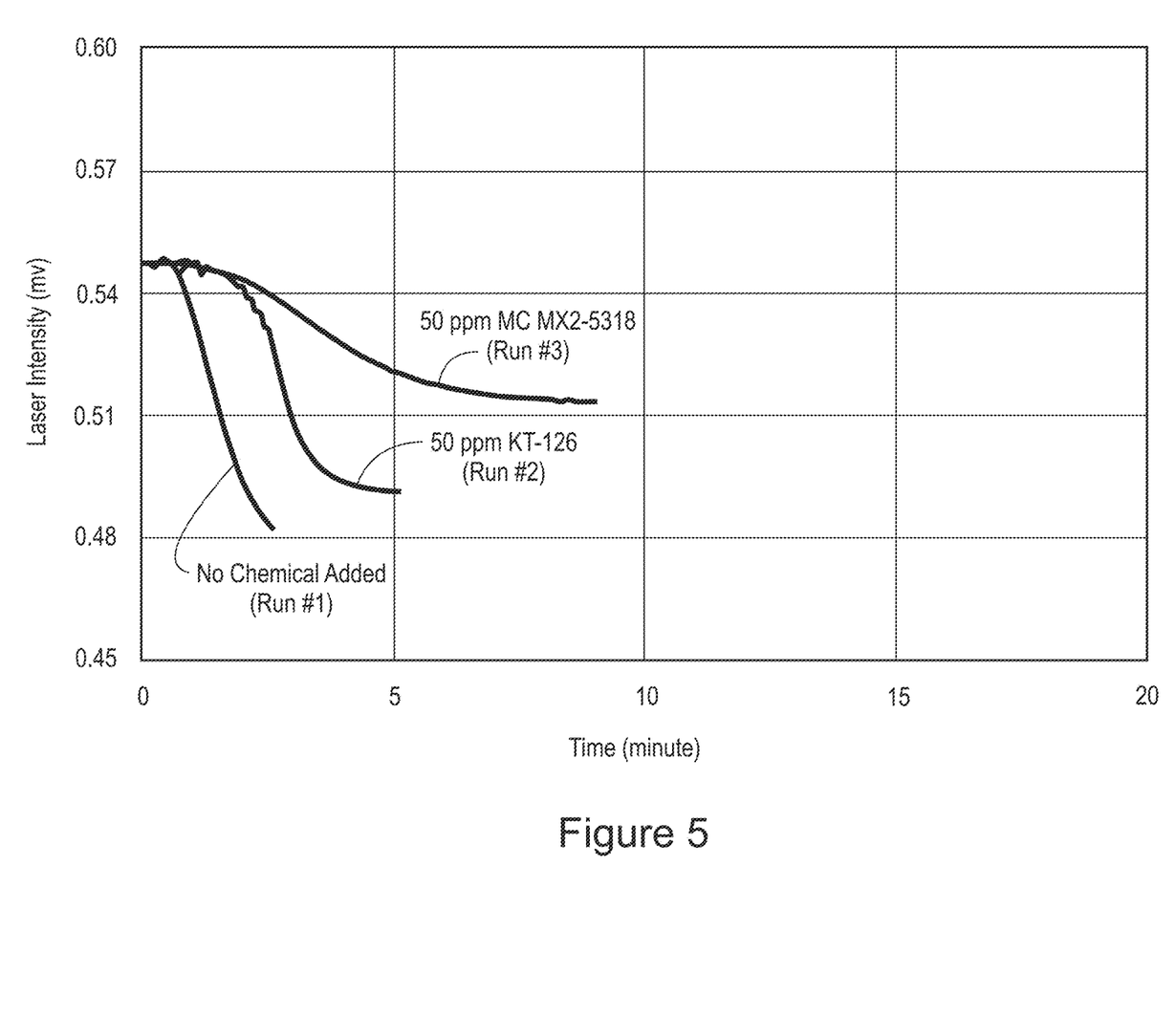
FIG. 5 is a graph of laser intensity over time.

FIG. 5 shows that barite scale formed quickly in the absence of scale inhibitors (Run #1). When 50 ppm of scale inhibitor, KT-126 or MC MX2-5318, was added (Runs #2 and #3, respectively), the barite scaling process was delayed only slightly; noticeable changes in laser intensity were detected after 3 minutes. The scale formation was not prevented even at high inhibitor dosages, suggesting that much higher inhibitor dosages are required for water without alkalinity.

Figure 6:
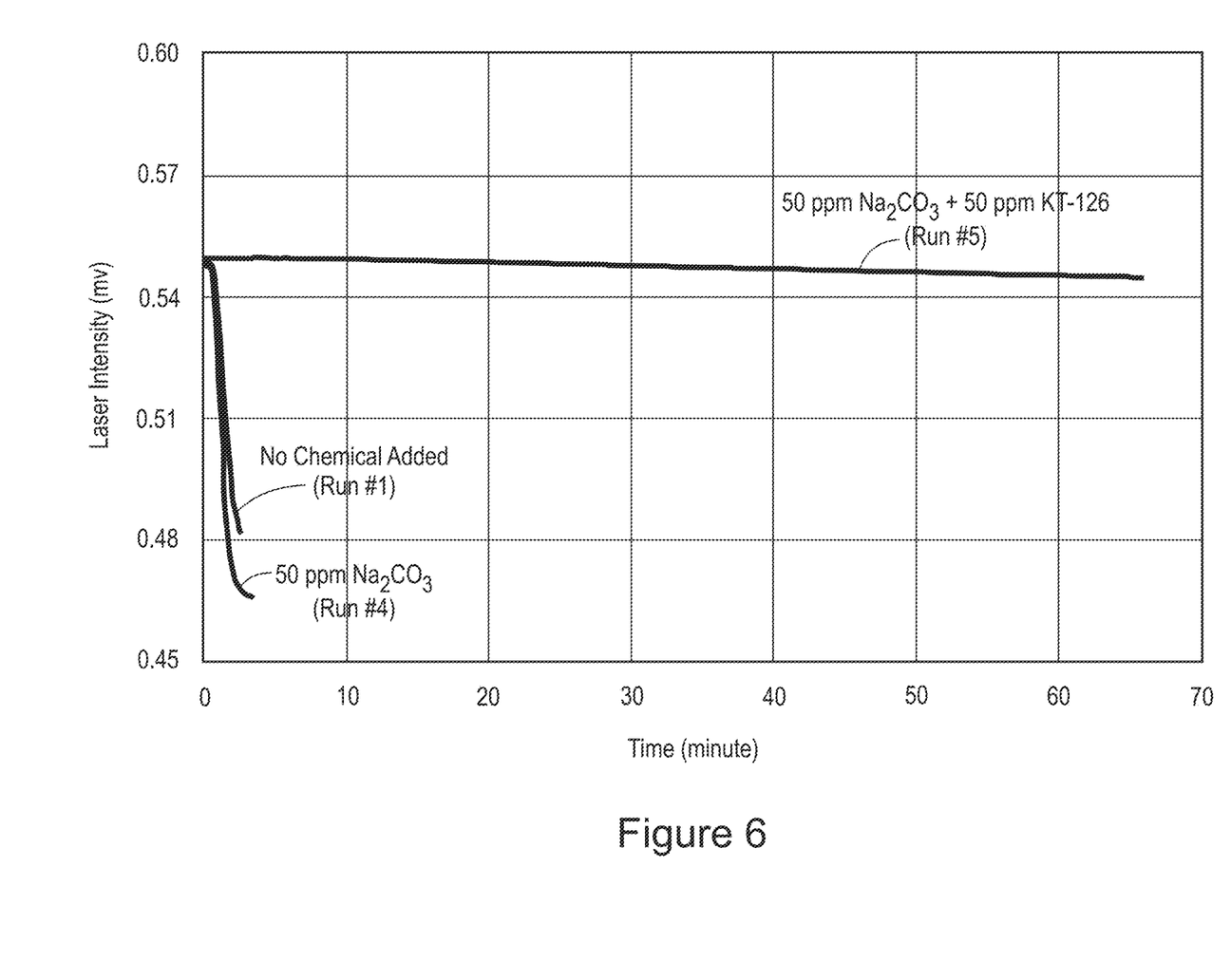
FIG. 6 is a graph of laser intensity over time.
Figure 7:
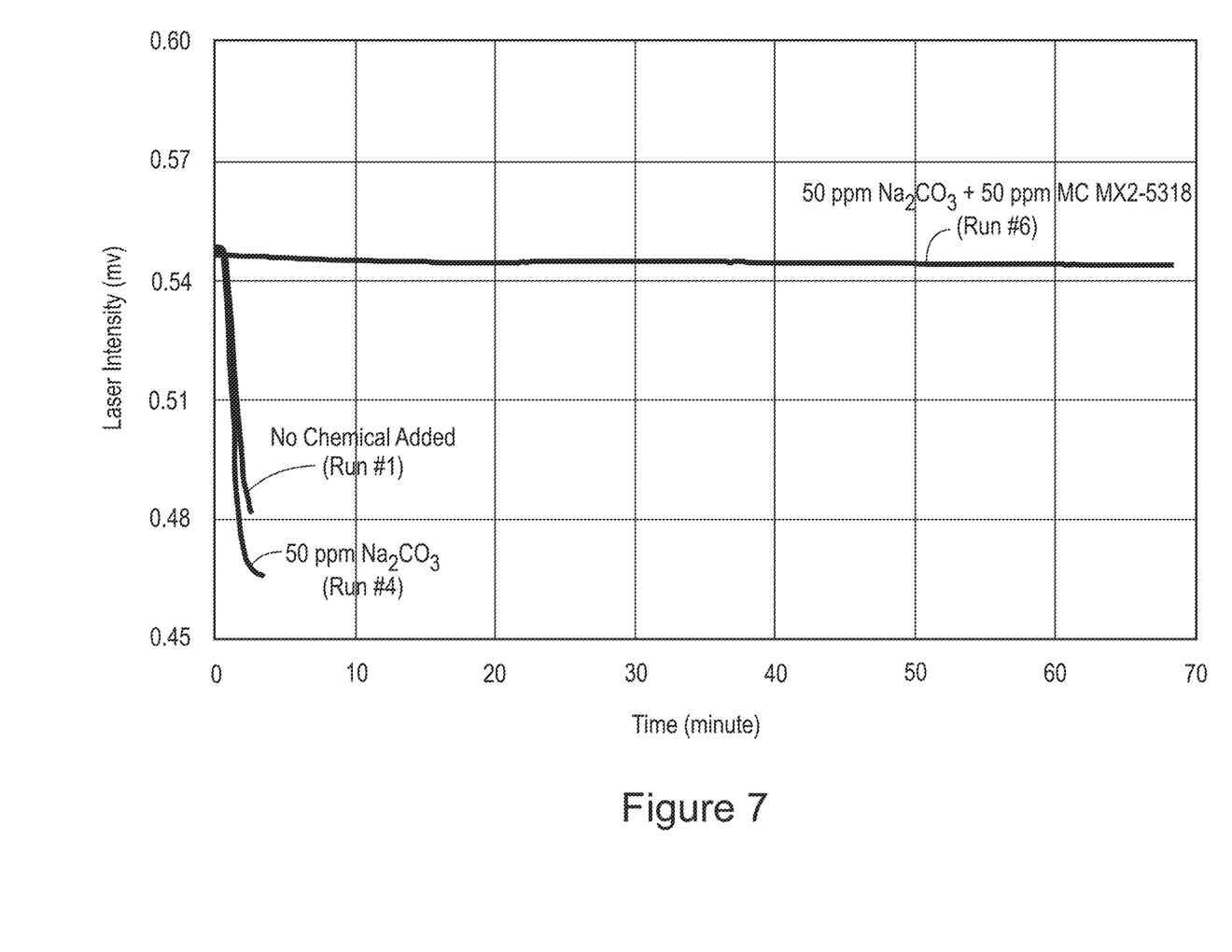
FIG. 7 is a graph of laser intensity over time.

As shown in FIGS. 6 and 7, 50 ppm $Na_2CO_3$ in the absence of scale inhibitors caused no noticeable changes in the scaling process (Run #4). However, barite scaling was almost completely inhibited by 50 ppm $Na_2CO_3$ with 50 ppm of Gyptron KT-126 (Run #5) or MC MX2-5318 (Run #6), as shown in FIGS. 6 and 7, respectively. The reduction in laser intensity was minimal over the test duration of over 60 minutes, suggesting barite scale formation was negligible.

Figure 8:
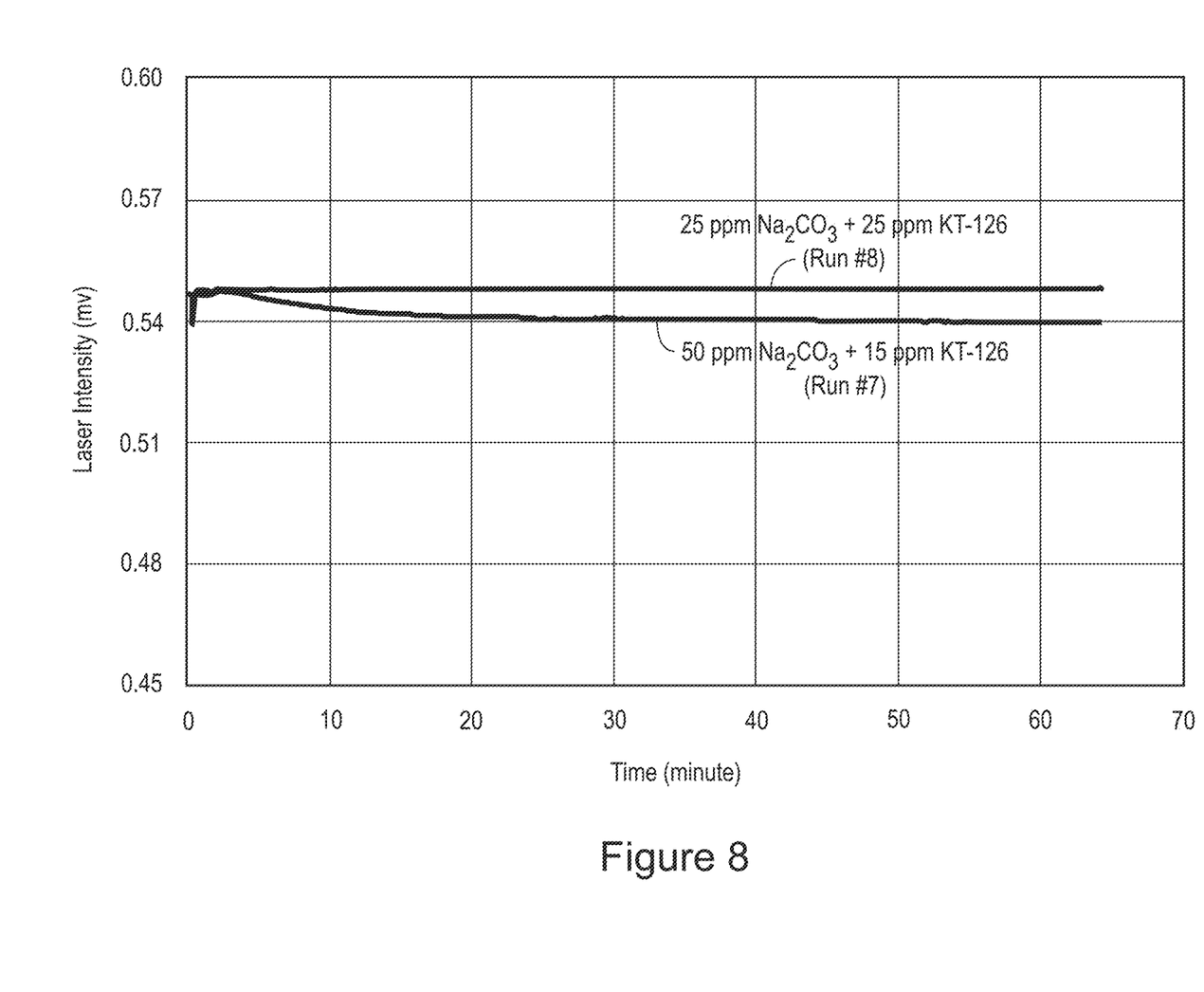
FIG. 8 is a graph of laser intensity over time.

As shown in FIG. 8, barite scaling was almost completed inhibited even at a relatively low concentration of KT-126 of 15 ppm in the presence of 50 ppm $Na_2CO_3$ (Run #7). Only a small decrease in laser intensity was observed during the test period. Barite scaling was prevented by 25 ppm of KT-126 with 25 ppm of $Na_2CO_3$ (Run #8).

Figure 9:
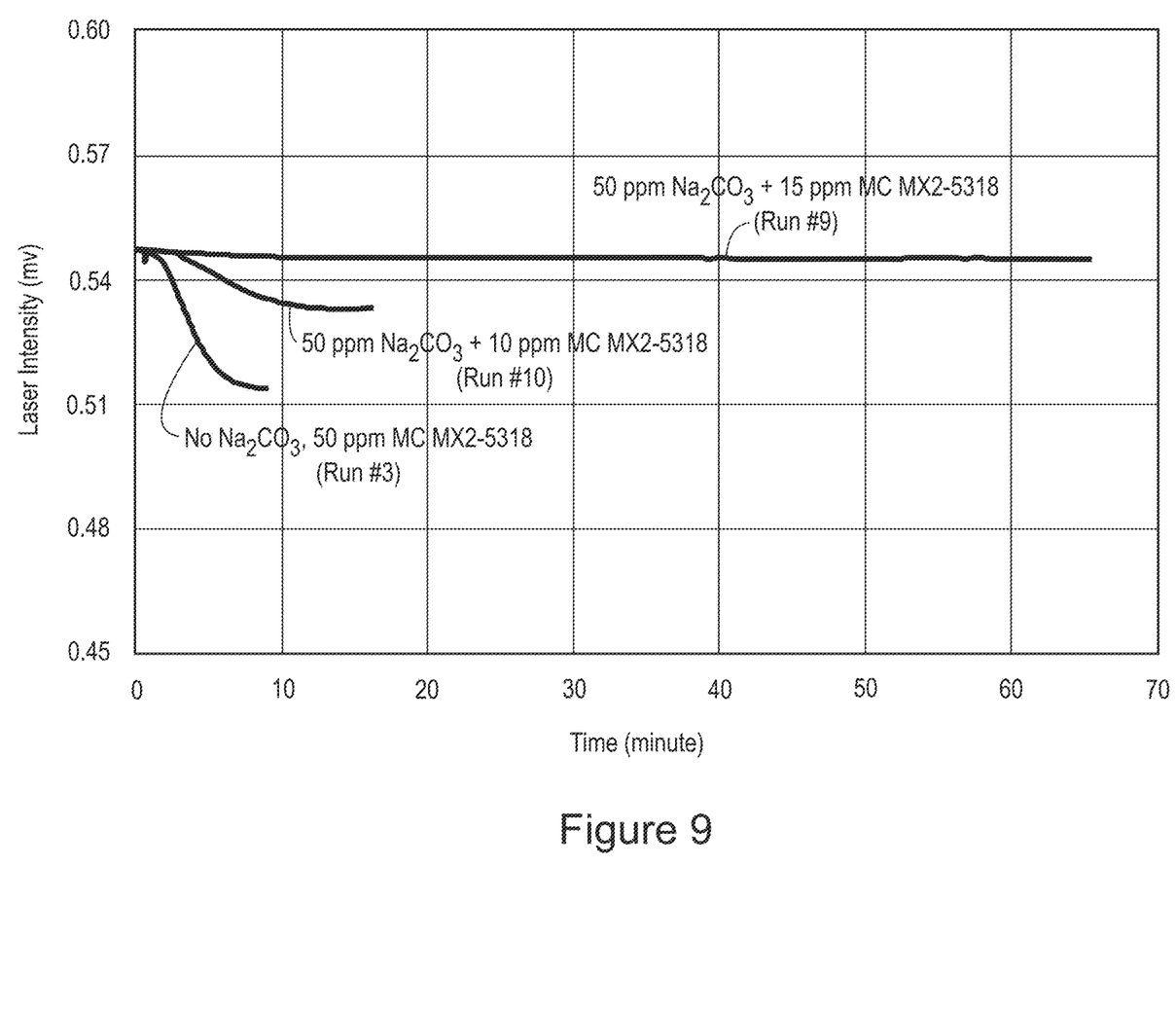
FIG. 9 is a graph of laser intensity over time.

As shown in FIG. 9, 15 ppm of MC MX2-5318 with 50 ppm $Na_2CO_3$ (Run #9) achieved complete inhibition of barite scale formation. 10 ppm of MC MX2-5318 with 50 ppm $Na_2CO_3$ (Run #10) showed improved effectiveness against scale formation relative to 50 ppm MC MX2-5318 without $Na_2CO_3$ (Run #3).

Figure 10:
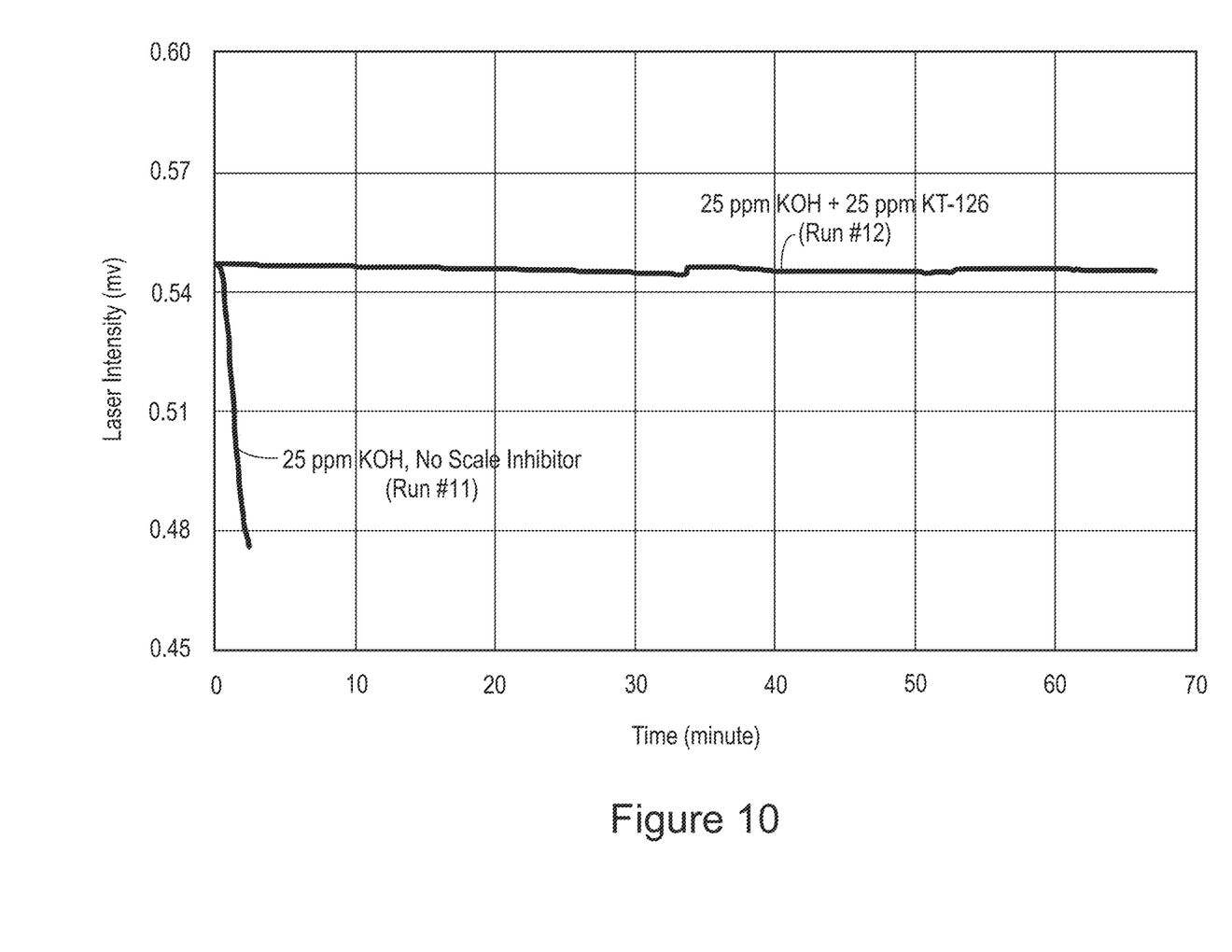
FIG. 10 is a graph of laser intensity over time.
Figure 11:
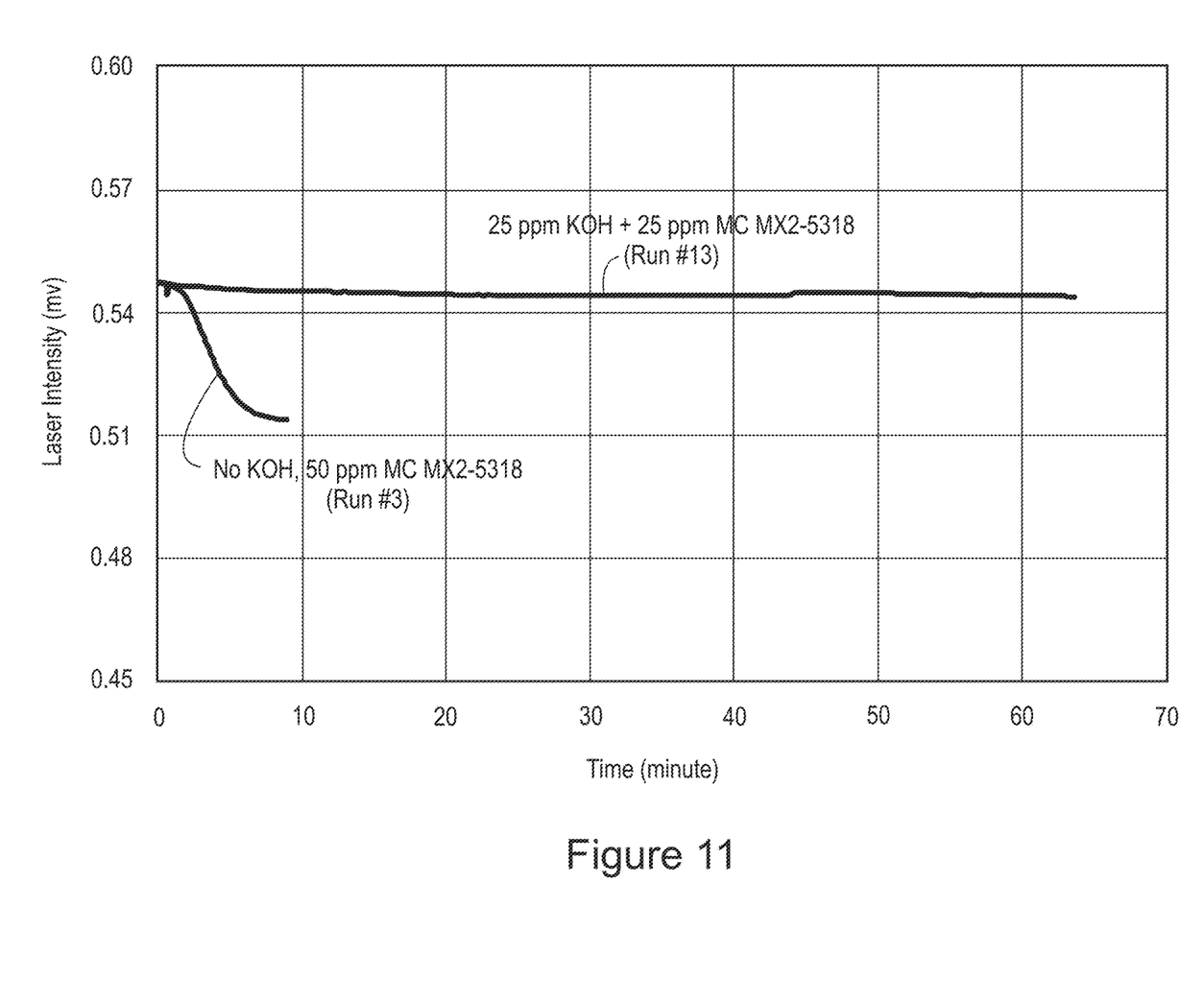
FIG. 11 is a graph of laser intensity over time.

The effect of KOH as an alkalinity chemical was also evaluated. Similar to $Na_2CO_3$, KOH alone had no effect in delaying barite scaling (Run #11) as shown in FIG. 10. The effectiveness of KT-125 (Run #12) and MC MX2-5318 (Run #13) were significantly elevated in the presence of KOH, as shown in FIGS. 10 and 11, respectively.

The results demonstrate that the scale inhibitor performance against barite was significantly improved by increasing the alkalinity of the treated waters, especially for treated waters without alkalinity or with very low levels of alkalinity (<15 mg/L). The required inhibitor concentration to prevent barite scale formation was significantly decreased, being reduced from >50 ppm to 10-15 ppm with 25 or 50 mg/L of alkaline chemical.

Additionally, pH measurements demonstrated that the pH increased from 4.9 to 6.7 and 7.8, with 25 and 50 mg/L sodium carbonate ($Na_2CO_3$) added, respectively. Consequently, the corrosivity of treated water is expected to be decreased, and the corrosion rate could be controlled at an acceptable level with reduced corrosion inhibitor concentrations.

Example 4—Scale Formed by Calcium

Figure 12:
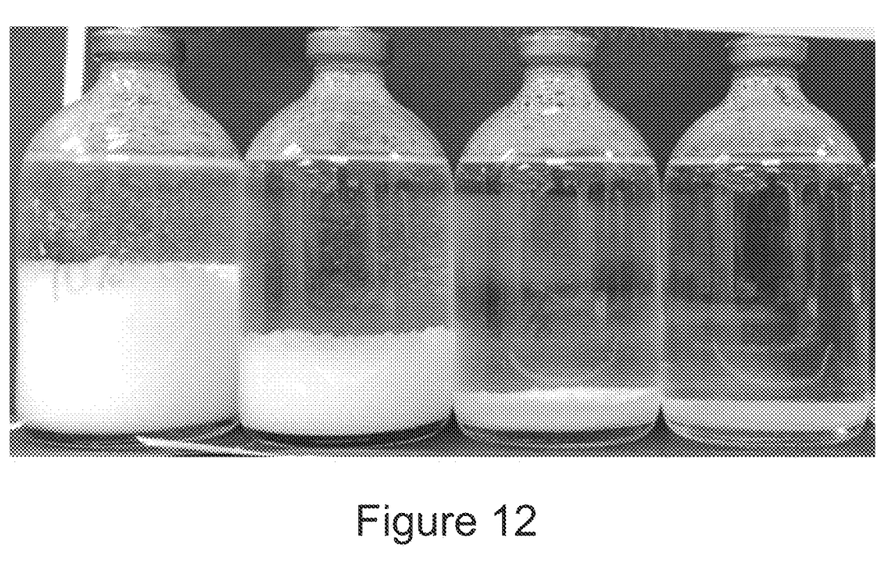
FIG. 12 is a photograph of samples with calcium precipitates.

FIG. 12 shows the pseudo-scale precipitates formed from the reaction between the inhibitor KT-126 and calcium in treated water with high concentration of calcium. The KT-126 concentration from left to right was 10%, 5%, 1%, 0.5% by volume, to simulate the inhibitor concentration gradient around the inhibitor injection nozzle. The composition of the water is shown in Table 4.

TABLE 4

| Water composition | |
|---|---|
| Sodium | 23900 |
| Potassium | 466 |
| Magnesium | 1355 |
| Calcium | 6836 |
| Strontium | 418 |
| Barium | 1 |
| Chlorides | 52900 |
| Sulfates | 634 |
| Alkalinity | 451 |

The results demonstrate that precipitates can form upon the addition of scale inhibitor to water with a relatively high calcium concentration. Therefore, if multiple streams are present with different calcium concentration, the scale inhibitor and alkaline chemical should be added to the stream with the lower (e.g., lowest) calcium concentration.

OTHER EMBODIMENTS

While certain embodiments have been disclosed above, the disclosure is not limited to such embodiments.

As an example, while embodiments have been described in which a scale inhibitor is disposed in a water stream upstream of where an alkaline chemical is disposed in the water stream, the disclosure is not limited to such embodiments. As an example, in some embodiments, the alkaline chemical can be disposed in the water stream upstream of where the scale inhibitor is disposed in the water stream. As another example, in some embodiments, the scale inhibitor and the alkaline chemical can be disposed in the water stream at the same location (e.g., simultaneously or in series). Further, for multi-branch conduits (e.g., as schematically depicted in FIG. 3), the disclosure is not limited to embodiments in which the scale inhibitor and the alkaline chemical are disposed within the same stream. Rather, in some embodiments, the scale inhibitor can be disposed in the water stream of one conduit, and the alkaline chemical can be disposed in the water stream of a different conduit. Moreover, the scale inhibitor and/or alkaline can chemical can optionally be disposed in a water stream having the higher concentration of divalent earth metal ions. Also optionally, multi-branch conduits can include more than three (e.g., four or more, five or more, six or more, seven or more, eight or more, nine or more, 10 or more) branches.

As another example, while embodiments have been disclosed that include the reduction (e.g., prevention) of scale containing sulfate (e.g., barium sulfate, calcium sulfate, strontium sulfate), the disclosure is not limited to such embodiments. As an example, in certain embodiments, the disclosure can be used to reduce (e.g., prevent) the formation of carbonate scales. Without wishing to be bound by theory it is believed that carbonate scales form from a change in temperature and/or pressure resulting in the release of carbon dioxide from a fluid.

As a further example, while embodiments have been disclosed that include the formation of scale in a hydrocarbon-producing well, the disclosure is not limited to such embodiments. In some embodiments, the well is an injection well. In some embodiments, the scale forms during an enhanced oil recovery operation, such as a waterflooding operation.

What is claimed:
1. A method, comprising:
   disposing a scale inhibitor and an alkaline chemical in a water stream,
   wherein:
   the water stream comprises sulfate ions and cations of a divalent earth metal;
   the alkaline chemical comprises at least one member selected from the group consisting of an inorganic salt, an organic salt and a metal oxide,
   the scale inhibitor is disposed in the water stream at a first location along the water stream;
   the alkaline chemical is disposed in the water stream at a second location along the water stream;
   the second location is downstream of the first location;
   downstream of the second location, a concentration of the alkaline chemical in the water stream is from 5 milligrams per liter (mg/L) to 500 mg/L; and downstream of the first location, a concentration of the scale inhibitor in the water stream is from 5 ppm to 50 ppm.

2. The method of claim 1, wherein the divalent earth metal comprises at least one member selected from the group consisting of barium, calcium and strontium.

3. The method of claim 1, wherein the alkaline chemical comprises a member selected from the group consisting of an alkali metal salt of carbonate, an alkali metal salt of bicarbonate, and an alkali metal salt of hydroxide.

4. The method of claim 1, wherein the alkaline chemical comprises a member selected from the group consisting of sodium hydroxide, sodium carbonate, sodium bicarbonate, potassium hydroxide, potassium bicarbonate, potassium carbonate and calcium oxide.

5. The method of claim 1, wherein at least one of the following holds:
the alkaline chemical comprises at least one metal oxide selected from the group consisting of calcium oxide and magnesium oxide; or
the alkaline chemical comprises at least one organic salt selected from the group consisting of aryl bicarbonate and alkyl ethyl carbonate.

6. The method of claim 1, wherein, downstream of the second location, the water stream has a pH of from 6 to 8.5.

7. The method of claim 1, wherein, upstream of the first location, a concentration of sulfate ions in the water stream is from 100 mg/L to 2500 mg/L.

8. The method of claim 1, wherein, at least one of the following holds:
upstream of the first location, the divalent earth metal in the water stream comprises barium, and a concentration of barium is from 5 mg/L to 250 mg/L;
upstream of the first location, the divalent earth metal in the water stream comprises strontium, and a concentration of strontium is from 100 mg/L to 2000 mg/L; or
upstream of the first location, the divalent earth metal in the water stream comprises calcium, and a concentration of calcium is from 10000 mg/L to 30000 mg/L.

9. The method of claim 1, wherein:
the water stream is contained in an interior space of a conduit; and
the conduit is a component of at least one member selected from the group consisting of a wellbore, a downhole tubular to surface flowline, and a separation plant.

* * * * *